Sept. 17, 1963　　　　N. C. POEL ET AL　　　　3,104,004
CONVEYOR TRANSFER

Filed Sept. 22, 1960　　　　　　　　　　　　　　3 Sheets-Sheet 1

INVENTORS
NORMAN C. POEL
HAROLD VAN ASSELT
AUGUST V. REDLICHS

BY Price and Heneveld

ATTORNEYS

Sept. 17, 1963   N. C. POEL ET AL   3,104,004
CONVEYOR TRANSFER
Filed Sept. 22, 1960   3 Sheets-Sheet 2

INVENTORS
NORMAN C. POEL
HAROLD VAN ASSELT
AUGUST V. REDLICHS
BY Price and Heneveld
ATTORNEYS Sept. 17, 1963 N. C. POEL ET AL 3,104,004
CONVEYOR TRANSFER
Filed Sept. 22, 1960 3 Sheets-Sheet 3
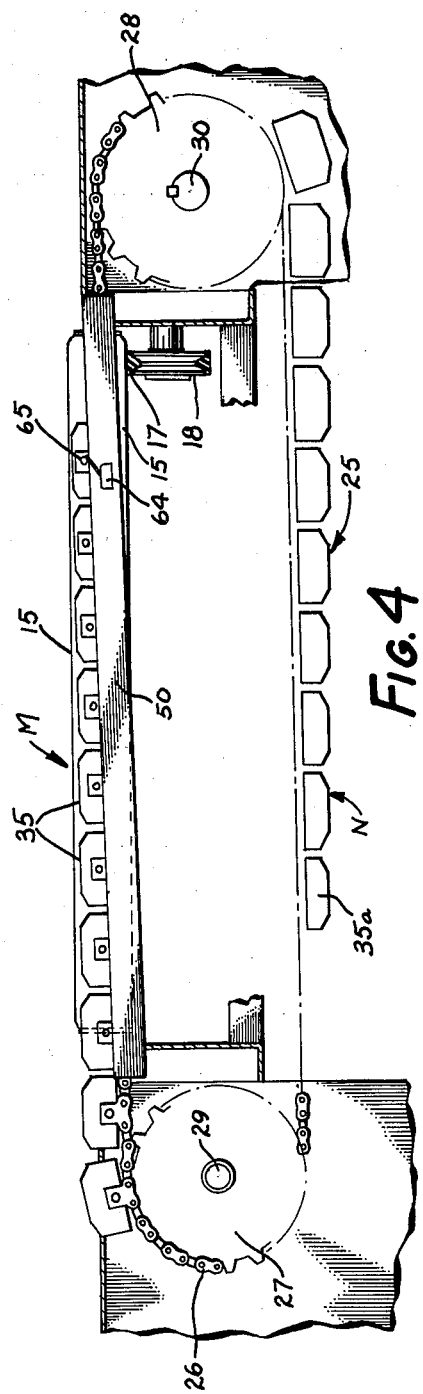
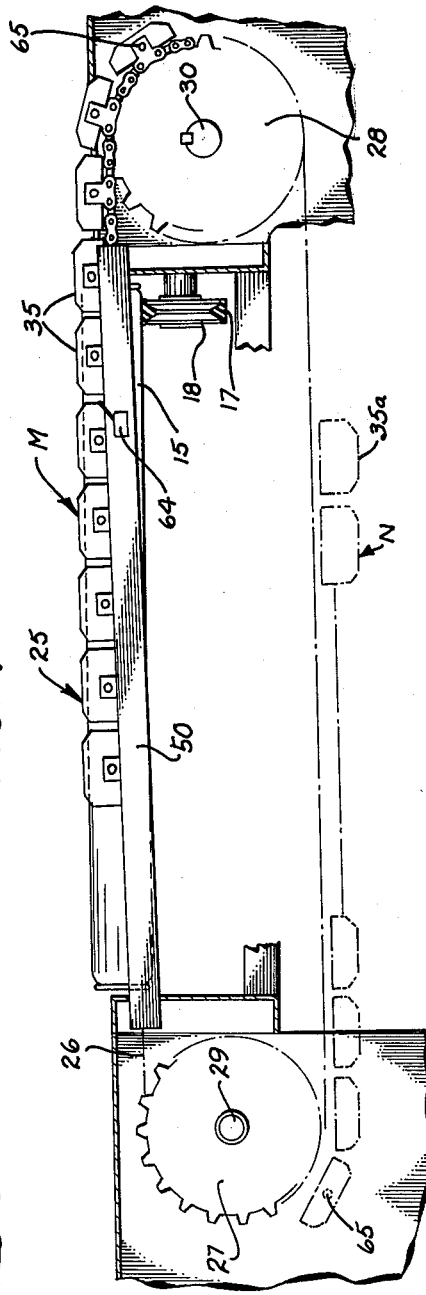
INVENTORS
NORMAN C. POEL
HAROLD VAN ASSELT
AUGUST V. REDLICHS
BY *Price and Heneveld*
ATTORNEYS United States Patent Office 3,104,004
Patented Sept. 17, 1963

3,104,004
CONVEYOR TRANSFER
Norman C. Poel, Harold Van Asselt, and August V. Redlichs, Grand Rapids, Mich., assignors to The Rapids-Standard Company, Inc., Grand Rapids, Mich., a corporation of Michigan
Filed Sept. 22, 1960, Ser. No. 57,786
2 Claims. (Cl. 198—20)

This invention relates to a transfer for a conveyor. More particularly this invention relates to a transfer mechanism for moving an article sideways off a conveyor.

Transfers of many types are well-known to the conveyor art. However, many of these transfers are characterized by inherent disadvantages, such as dragging the article across the surface of the conveyor when moving it sideways. This causes substantial side pressures to the lateral movement of the article and frequently damages the article. Further, when belt conveyors are utilized, it is impractical to push the articles across the belt surface at right angles to the belt's direction of movement. The operation of dragging an article sideways across a moving belt cannot be completed rapidly and consequently other articles on the conveyor tend to pile up against the article being transferred. In order for a conveyor transfer to be truly efficient in operation, the transfer must be completed rapidly so that an article is removed from the conveyor bed before the next article arrives to interfere with the operation. The forcing of the article sideways over the belt surface results in excessive belt wear and sometimes damage to the article. Further, the force required will cause damage to fragile articles and may mistrack the belt.

It is therefore an object of this invention to provide a conveyor transfer which rapidly transfers an article sideways off a conveyor.

Another object of this invention is to provide such a transfer which does not drag the article to be removed across the conveyor, but rather lifts it therefrom while moving it sideways.

Another object of this invention is to provide such a transfer which is simple in construction and operation, thereby assuring efficiency and a minimum of operational difficulties.

Still another object of this invention is to provide a transfer which permits the main conveyor to be powered even through the transfer zone.

An additional object of this invention is a transfer adapted to continuous, intermittent or occasional and selective operation.

A still further object of this invention is to provide such a conveyor system and transfer which is well adapted to be utilized in a completely automatic system.

These and other objects of this invention will become obvious to those skilled in the conveyor art upon reading the following specification in conjunction with the accompanying drawings, wherein:

FIG. 4 is an enlarged view, similar to and emphasizing certain features of FIG. 2, the transfer being in inoperative position;

FIG. 5 is a view similar to FIG. 4, the transfer being shown in lifting position;

Briefly, this invention relates to a transfer for moving articles sideways off a powered conveyor including a movable member positioned transversely with respect to the direction of movement of the conveyor. This member lies below the conveying surface of the conveyor and is inclined to the conveying surface. The inclined member is movable transversely to the direction of movement of the conveyor. Means extend from this member toward the conveying surface, the height of this means progressively differing from end to end. The top of this means lies generally parallel to and normally below the conveying surface. Upon movement of the inclined member, the top of this means rises through and above the conveying surface whereby an article is raised from the surface of the conveyor and moved sideways off the conveyor.

In a more limited aspect of this invention, a conveyor system is provided including a transfer of the type described, the transfer positioned within a specially constructed transfer zone in the main conveyor. Rollers are provided above the propelling member in the transfer zone, the rollers being driven to provide power conveyance through the zone and thus provide powered conveyance throughout the entire length of the main conveyor. The means described above rises between these rollers upon movement of the member as described.

Figure 1:
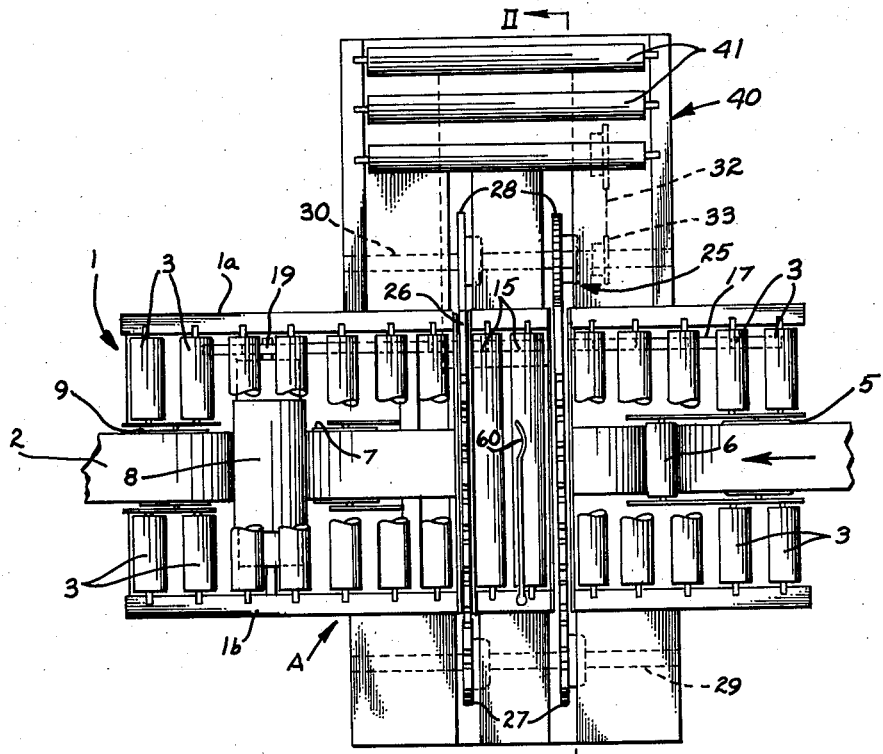
FIG. 1 is a fragmentary plan view of the conveyor system and transfer comprising this invention, certain parts thereof being broken away to better show the invention.

Referring more specifically to the drawings, the reference numeral 1 designates a main conveyor, including side rails 1a and 1b, adapted to move in the direction shown by the arrow in FIG. 1. In the embodiment shown, this main conveyor includes a driven belt or propelling member 2 flanked by a plurality of rollers 3, mounted on each side of the belt 2, providing relatively frictionless support for articles being moved along by the powered belt 2. It is to be understood that this invention is not limited to any particular type of conveyor. Rather, the invention is shown embodied in a system which may be completely automatic. Further, the invention will find its greatest application in powered conveyors since the disadvantages noted hereinbefore are particularly troublesome with respect to such conveyors.

Figure 3:
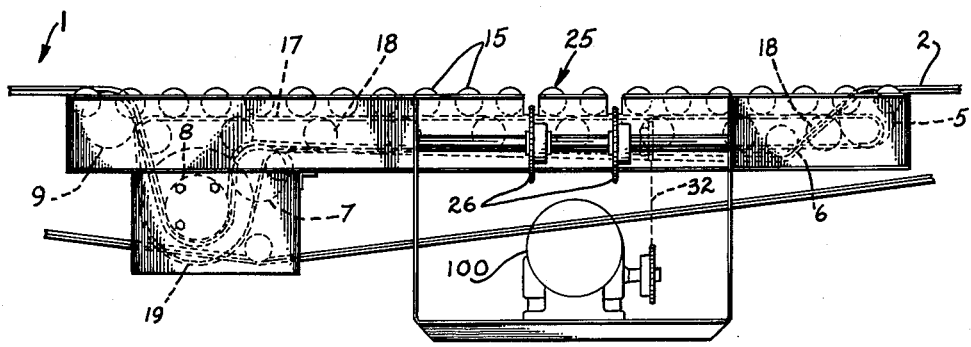
FIG. 3 is a side elevational view of the conveyor system and transfer shown in FIG. 1.

A transfer zone A is provided in the surface of the conveyor 1. In the embodiment shown, the belt 2 dips below the conveying surface of the conveyor 1 (FIG. 3). As the belt 2 passes over the pulleys 5, the tops of which normally lie slightly below the conveying surface, it drops below the roller 6. The belt 2 then extends for a distance below the conveying surface, passing over the pulley 7, under the driven pulley 8, returning to the conveying surface upon passing over the pulleys 9, the tops of which generally lie slightly below the conveying surface. A plurality of driven rollers 15 are mounted on the side rails 1a and 1b of the conveyor 1, filling in the transfer zone A in the conveying surface. The tops of these driven rollers 15 lie in the plane of the conveyor surface. A V-belt 17 engages the bottoms of these rollers 15, the V-belt 17 being supported and held in position by a plurality of pulley wheels 18. The V-belt 17 is driven by passing around the drive pulley 19 which in turn is driven by the belt 2 through the driven pulley 8. Thus, the driven pulley 8 drives each of the rollers 15 through the V-belt 17. Since the belt 17, as it contacts the bottom of the rollers 15, is moving oppositely to the propelling belt 2, the rollers are so rotated as to propel an article in the same direction as the belt 2. Since the pulley 19 is larger than the driven pulley 8, the V-belt 17 moves at an accelerated rate. It will thus be noted that the rollers 15 in conjunction with the driven belt 2 provide a continuous powered conveying means, the rollers 15 providing an accelerated powered conveyance across the transfer zone created by the dipping of the belt 2 as described, assuring that articles will be properly separated for transfer at that zone.

Figure 2:
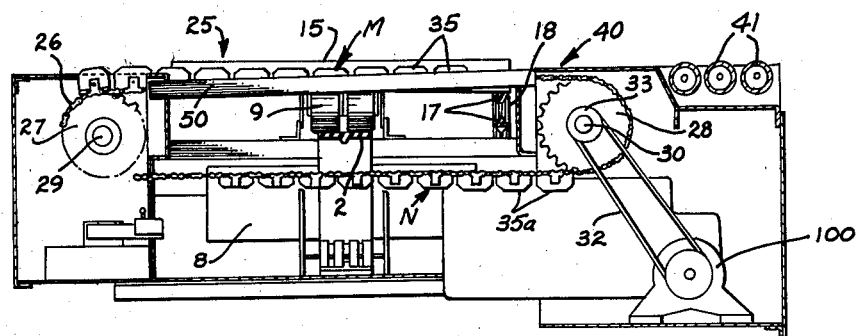
FIG. 2 is a sectional elevation view taken along the plane II—II of FIG. 1.

The transfer mechanism comprising this invention is designated by the reference numeral 25 and is best shown in FIGS. 1 and 2. The transfer mechanism 25 includes a pair of endless chains 26 having upper and lower runs, each mounted about sprockets 27 and 28, the sprockets being connected by the shafts 29 and 30 respectively. The sprockets 28 are supported for rotation and are driven by the motor 100 which drives the chain 32 extending around a sprocket 33 fixed to the shaft 30. It will be noted that the endless chains are positioned for movement in a plane lying below and inclined to the conveying surface. Thus, as the motor 100 drives the chain 32 and the shaft 30, the endless chains 26 will pass about the sprockets 27 and 28, their movement being transverse to the direction of movement of the main conveyor and in a plane lying at an angle to the surface of the main conveyor.

Two groups of lifting elements or fingers, designated by the reference letters M and N, are mounted on each of the endless chains 26. Each group of fingers comprises a plurality of individual fingers or sections 35 and 35a respectively, each finger being of a different height. This difference in height between each finger in each group of fingers is directly proportionate to the inclination of the endless chains with respect to the conveying surface. As shown in FIG. 4, when the group of fingers M is positioned as shown, the top of each individual finger 35 lies in a third plane which is generally parallel to and just below the conveying surface. In this position, the group of fingers N lies on the opposed side of the endless chain 26 and each individual finger 35a extends downwardly away from the fingers in group M.

Upon supplying power to the shaft 30, causing the endless chains 26 to move to the right as shown in FIG. 4, it will be noted that the tops of the individual fingers 35 of group M rise due to the movement of the endless chains in an inclined plane. As the endless chains move, the tops of these fingers, lying between a pair of driven rollers 15, collectively pass through and above the conveying surface (FIG. 5). The ends of the fingers in each group are arranged in a plane which is generally parallel to the conveyor surface when the group is situated on the inclined tracks 50. Thus, any article lying above the transfer mechanism 25 will be lifted and thus disengaged from the powered conveyor and moved to the right as shown in FIG. 5. The articles are both lifted upwardly from the surface of the conveyor and carried sideways therefrom. The trailing finger in each group of fingers may extend above the plane passing through the ushers to assure that the article will be moved to the side. As shown in FIG. 1, a receiving structure 40 is provided adjacent the conveyor 1, including a plurality of rollers 41 upon which the article is deposited as it moves sideways from the conveyor 1. As the group of fingers M move in this manner to produce this result, the group of fingers N are simultaneously moved to a position where each individual finger 35a extends toward the conveying surface, the tops thereof lying just below the conveying surface as described hereinbefore. It will thus be noted that the group of fingers N are positioned to remove another article from the conveyor.

It has already been noted that the main conveyor 1 is powered throughout its length, by the movable belt 2 and by the plurality of driven rollers 15. The transfer mechanism is well adapted to be made completely automatic by providing for the interruption of a photocell or some other suitable means of controlling the actuation of the driving motor 100 of the transfer mechanism 25. By such means, the mere pressing of a button would move the chains 26 a distance such that one group of fingers was always in position to move the next article from the conveyor.

The upper run of the chains 26 rides on the support tracks 50. These tracks support the chains and the fingers and prevent any downward deflection of the chains due to the load imposed by the article being lifted from the conveying surface.

As shown in FIGS. 1 and 2 the belt 17 is located at the side of the conveyor adjacent the transfer's discharge. This permits the belt to be located between the upper and lower runs of the chains 26 with its upper run passing beneath the tracks 50 and retain contact with the driven rollers 15.

*Assembly and Operation*

The conveyor and transfer mechanism of this invention may be assembled as follows. The transfer mechanism 25 is mounted on the frame of the main conveyor 1, extending transversely to the direction of movement thereof. The sprockets 27 and 28 are positioned such that the endless chains 26 extending therearound move through a plane which is inclined to the plane of the conveying surface of the main conveyor 1. Groups of fingers M and N are mounted on each endless chain 26, the individual fingers being of differing lengths such that the tops thereof in one position lie in a plane just below and generally parallel to the conveying surface of the main conveyor. The fingers 35 and 35a in each group of fingers extend between a pair of driven rollers 15. The motor 100 is positioned at a convenient location and the chain 32 is operably connected between the motor and the shaft 30 connecting the sprocket 28.

Since the groups of fingers M and N must pass through the conveying surface of the main conveyor, the powered belt 2 is dropped below the conveying surface and is replaced by the driven rollers 15, returning to the conveying surface on the other side of the transfer. Thus, as will be noted from FIG. 3 the powered belt 2 passes through the transfer mechanism 25 without interference with the transversely arranged chains 26. The belt 17 drives the rollers 15, providing continuity of propulsion for articles moving into or through the transfer zone.

When it is desired to move an article sideways off the conveyor to transfer it to a work station, an inspection bench or to another conveyor, etc., the transfer mechanism 25 operates as follows. Upon actuation of the motor 100, the endless chains 26 move up the inclined tracks 50. This causes the tops of the fingers 35 of one of the groups of fingers to rise between the rollers 15, through and above the conveying surface of the conveyor. Although there may be a sight sideways movement of the article before it is lifted free of the rollers 15, this is minimal since disengagement of the article from the conveying surface is rapid. Further, the rollers 15 are normally fabricated of steel or aluminum, producing a surface which permits side movement without the frictional resistance characteristic of conventional conveyor belts. Such a movement simultaneously lifts the article from the conveyor and moves it sideways to the receiving structure 40 where it is deposited on the rollers 41. As this is being done, the other groups of fingers automatically move into position ready to remove another article from the conveyor.

It will be noted that the actuation of the chains 26 has to be timed. Each cycle of operation involves only sufficient movement of the chains as will move one group of fingers from the ready position on the tracks 50 below the conveying surface to the storage position on the lower run of the chains. In the structure illustrated, this movement involces a half-cycle travel of the chains 26. Normally at the end of each cycle, movement of the chains stops. However, it will be recognized that under the proper circumstances and with proper coordination in timing of the conveyor and the transfer mechanism the chains 26 could be operated continuously with the delivery schedule of the conveyor timed to place any article on the transfer at every one or at certain selected cycles of the transfer.

Figure 7:
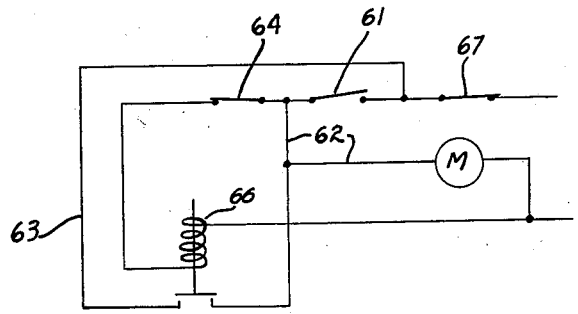
FIG. 7 is a wiring diagram of the control circuits for the transfer chain driving motor.

When the transfer is manually operated, the actuation of the transfer chains 26 may be effected through any suitable control means provided the operator. However, when it is automatic, means will normally be provided to detect the presence of an article on the transfer and in response thereto trigger the actuation of the transfer chains 26. There are numerous ways in which this can be accomplished, one of which is to provide a sensing sweep arm 60 (FIG. 1) extending over the conveying surface in the transfer zone. As the sweep arm 60 is moved aside by an article passing through the transfer zone, it closes the normally open switch 61 (FIG. 7). Its closing completes a circuit 62 which bypasses the switch 64 since the latter switch is being held open at the initial phase of each operating cycle. When switch 64 closes, the normally open relay 66 close providing a circuit 63 to the motor 100. This circuit bypasses the switch 61. When the removal of the article by the transfer chains 26 releases the sweep arm 60, the switch 61 reopens but the bypass relay 66 remains closed holding the relay 63 closed. Thus, the motor will continue to operate until the switch 64 is opened. As the chains 26 and 27 complete one full cycle of operation or one-half cycle of movement, the lead finger of the other group opens the normally closed switch 64.

Figure 6:
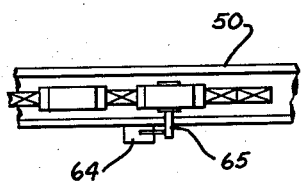
FIG. 6 is a fragmentary, enlarged plan view of the lead end of one of the transfer chains.

This latter may be accomplished by extending one end of the mounting pin 65 for the lead finger of each group (FIGS. 4-6). Thus, it may actuate the limit switch 64 mounted on one of the tracks 50.

If it is desired to deactivate the transfer so articles will pass through the transfer zone without removal, the main control switch 67 is opened (FIG. 7). It will also be recognized that suitable flow control gates or other timing and spacing mechanism may be provided in the main conveyor to regulate the rate of delivery of articles by the conveyor to the transfer zone. This will prevent possible jamming of the control devices by articles piling up against each other in this zone.

This transfer may be used with a live roll conveyor wherein the conveying surface is formed by rollers driven by a powered belt contacting the lower surfaces. The arrangement of the mechanism would be the same except to rig the drive for the belt 17 such that the rollers 15 in the transfer zone are rotated in the same direction as the rollers of the bed of the main conveyor. It will be recognized that this invention may be used with gravity conveyors although in such conveyor the problems do not normally exist to which this invention provides the solution. Thus, its application to such conveyors would seldom be necessary.

It will be noted that a transfer has been provided which moves an article sideways rapidly off a conveyor. The article is not dragged across the conveyor surface, but rather is lifted therefrom while it is moved sideways. This reduces wear and tear on the conveyor surface, this being especially important with respect to belt conveyors. The invention is particularly adapted to the transfer of heavy or fragile articles without damage or wear to either the conveyor or the article. Further, a conveying system has been shown which includes such a transfer, the main conveyor being powered along its entire length, including the transfer zone.

While only one embodiment of this invention has been shown and described, it may be possible to practice this invention through the use of certain other embodiments. These other embodiments are to be included in the spirit and scope of this invention as recited in the following claims.

We claim:

1. A conveying system including a transfer for moving articles sideways off the main conveyor, comprising: a movable member positioned within an opening in the conveying surface of the main conveyor and extending transversely with respect to the direction of movement thereof; said member lying below said conveying surface of the main conveyor and positioned in a second plane inclined to said conveying surface, said member being inclined throughout its entire length; said member movable in said inclined second plane transversely to the direction of movement of the main conveyor; rollers positioned in said opening above said movable member; means for driving said rollers to provide powered conveyance across said opening at an accelerated rate of speed to assure separation of articles moving along the main conveyor; means extending from said member toward said conveying surface, the height of said means progressively differing from end to end; the top of said means lying generally parallel to said conveying surface and normally lying below said conveying surface; and said top of said means rising between said rollers and through and above said conveying surface upon said movement of said member in said second plane for lifting an article from the surface of the rollers and moving it sideways from the main conveyor while maintaining the article in an attitude substantially parallel to the surface of said main conveyor at all times during said sideways movement.

2. A conveying system including a transfor for moving articles sideways off the main conveyor, comprising: a movable member positioned within an opening in the conveying surface of the main conveyor and extending transversely with respect to the direction of movement thereof; said member lying below said conveying surface of the main conveyor and positioned in a second plane inclined to said conveying surface, said member being inclined throughout its entire length; said member movable in said inclined second plane transversely to the direction of movement of the main conveyor; rollers positioned in said opening above said movable member; means for driving said rollers to provide powered conveyance across said opening to assure movement of articles along the main conveyor; means extending from said member toward said conveying surface, the height of said means progressively differing from end to end; the top of said means lying generally parallel to said conveying surface and normally lying below said conveying surface; and said top of said means rising between said rollers and through and above said conveying surface upon said movement of said member in said second plane for lifting an article from the surface of the rollers and moving it sideways from the main conveyor while maintaining the article in an attitude substantially parallel to the surface of said main conveyor at all times during said sideways movement.

References Cited in the file of this patent

UNITED STATES PATENTS

| | | |
|---|---|---|
| 2,528,865 | Dale | Nov. 7, 1950 |
| 2,809,739 | Temple | Oct. 15, 1957 |

FOREIGN PATENTS

| | | |
|---|---|---|
| 141,957 | Sweden | Sept. 1, 1953 |